United States Patent [19]

Muraoka

[11] Patent Number: 5,343,531
[45] Date of Patent: Aug. 30, 1994

[54] AUDIO REPRODUCING APPARATUS

[75] Inventor: Yoshiro Muraoka, Tokyo, Japan

[73] Assignee: Sony Corporation, Tokyo, Japan

[21] Appl. No.: 972,654

[22] Filed: Nov. 6, 1992

[30] Foreign Application Priority Data

Nov. 8, 1991 [JP] Japan .................. 3-293260

[51] Int. Cl.$^5$ .................................................. H04S 1/00
[52] U.S. Cl. ............................................. 381/1; 381/28
[58] Field of Search .................................... 381/1, 28

[56] References Cited

U.S. PATENT DOCUMENTS

| 4,856,064 | 8/1989 | Iwamatsu | 381/1 |
| 4,866,774 | 9/1989 | Klayman . | |
| 4,887,045 | 12/1989 | Nakayama | 381/1 |
| 4,953,212 | 8/1990 | Otsubo | 381/1 |

FOREIGN PATENT DOCUMENTS 61-234607 10/1986 Japan .

Primary Examiner—Forester W. Isen
Attorney, Agent, or Firm—Robert P. Biddle; Jerry A. Miller

[57] ABSTRACT

A vocal sound can be erased by a simple arrangement. An audio reproducing apparatus in which a sum signal and a difference signal of left and right signals of a stereophonic signal are supplied thereto, a left signal and a right signal are obtained from the sum signal and the difference signal and the left signal and the right signal are respectively supplied to a left signal output terminal and a right signal output terminal includes switches ($SW_1$ to $SW_4$) for supplying the difference signal to the left and right signal output terminals ($T_L$, $T_R$) by switching the left and right signals.

6 Claims, 2 Drawing Sheets

AUDIO REPRODUCING APPARATUS

BACKGROUND OF THE INVENTION

1. Field of the Invention

The present invention relates generally to an audio reproducing apparatus for use with a so-called 8-mm video tape recorder (8-mm VTR) or the like.

2. Description of the Prior Art

FIG. 1 of the accompanying drawings shows an arrangement of an audio reproducing apparatus applied to 8-mm video tape recorders according to the prior art.

As shown in FIG. 1, on the recording side, stereophonic left and right signals L and R are respectively amplified by amplifiers $1_L$ and $1_R$ and then output to an adder 2 and a subtractor 3, in which they are processed to provide a sum signal $(L+R)/2$ and a difference signal $(L-R)/2$, respectively. The sum signal $(L+R)/2$ is reduced in noise by a noise reduction circuit $4_L$ and then applied to a frequency modulator circuit $5_L$. The frequency modulator circuit $5_L$ has a carrier of 1.5 MHz, for example. This frequency modulator circuit $5_L$ frequency-modulates this carrier by the sum signal $(L+R)/2$ and outputs the frequency-modulated signal to an adder 6. This is also true for the difference signal $(L-R)/2$. That is, the difference signal $(L-R)/2$ is reduced in noise by a noise reduction circuit $4_R$ and output to a frequency modulator circuit $5_R$, in which a carrier of 1.7 MHz, for example is frequency-modulated by the difference signal $(L-R)/2$ and then output to the adder 6. The sum and difference signals thus modulated are added by the adder 6 and then recorded on a magnetic tape T by a recording head $H_R$ together with a video signal.

On the other hand, in the reproducing side, a sum signal and a difference signal reproduced from the magnetic tape T by a reproducing head $H_p$ together with the video signal are respectively extracted as carriers of 1.5 MHz and 1.7 MHz by bandpass filters $7_L$, $7_R$ having frequencies of 1.5 MHz and 1.7 MHz, respectively. The frequency component of 1.5 MHz that has been extracted by the bandpass filter $7_L$ is demodulated by a demodulator circuit $8_L$ to provide the original sum signal. This sum signal is output through a noise reduction circuit 9L. Similarly, a frequency component of 1.7 MHz that has been extracted by the bandpass filter $7_R$ is demodulated by a demodulator circuit $8_R$ to provide the original difference signal which is output through a noise reduction circuit $9_R$. The left and right sum and difference signals are supplied to an adder 10 and a subtractor 11 from which they are output from left and right output terminals $T_L$ and $T_R$ as stereophonic reproduced signals L and R, respectively.

Generally, in the stereophonic system, the stereophonic left and right signals L and R contain a center sound such as man's voice (hereinafter referred to as a vocal sound) or the like. This center sound is, when reproduced, localized at the center. Accordingly, if a difference between the left signal L and the right signal R is formed and reproduced, the center sound such as the vocal sound or the like is erased or the output level of the center sound is reduced considerably. In particular, when the user wants to erase the vocal sound in the songs highlighting the vocal sound or the like, it is effective to utilize this difference signal.

As conventional apparatus that can erase the vocal sound based on the difference signal, there are known a CD (compact disc) player, a multi-disc player and so on. These apparatus include a voice erasing circuit for erasing a vocal sound, wherein the difference signal $(L-R)$ is formed from the left and right signals L, R and the vocal sound is erased only to reproduce a musical accompaniment. Thus, the user (listener) can listen to only the musical accompaniment or the user can sing a song to musical accompaniment or background music sound.

According to the above conventional apparatus, however, when the voice erasing circuit is constructed, a differential amplifier composed of an operational amplifier or the like is used in order to form a predetermined difference signal $(L-R)$. For this reason, the number of circuit assemble parts is increased and a space that these circuit assemble parts needs is increased, which unavoidably makes it impossible to make the audio reproducing apparatus compact in size and inexpensive.

Moreover, although the conventional 8-mm video tape recorder includes a stereophonic circuit in which the difference signal $(L-R)/2$ is formed, if the difference signal $(L-R)/2$ is reproduced as it is, then a reproduced sound becomes unnatural. As a consequence, such unnatural sound cannot be used as a listener sound or background sound.

OBJECTS AND SUMMARY OF THE INVENTION

Therefore, it is an object of the present invention to provide an improved audio reproducing apparatus in which the aforesaid shortcomings and disadvantages encountered with the prior art can be eliminated.

More specifically, it is an object of the present invention to provide an audio reproducing apparatus in which a vocal sound can be erased with ease by utilizing a difference signal produced within the apparatus.

It is another object of the present invention to provide an audio reproducing apparatus which can reduce the number of circuit parts.

It is still another object of the present invention to provide an audio reproducing apparatus which can be made compact in size.

It is a further object of the present invention to provide an audio reproducing apparatus which can be made inexpensive.

It is yet a further object of the present invention to provide an audio reproducing apparatus which can prevent a reproduced sound from becoming unnatural even when a vocal sound is erased.

It is still a further object of the present invention to provide an audio reproducing apparatus which can obtain a reproduced sound whose level is not changed even when the playback mode is switched.

According to an aspect of the present invention, there is provided an audio reproducing apparatus in which a sum signal and a difference signal of left and right signals of a stereophonic signal are supplied, a left signal and a right signal are obtained from the sum signal and the difference signal and the left signal and the right signal are respectively supplied to a left signal output terminal and a right signal output terminal. This apparatus includes switches for supplying the difference signal to the left and right signal output terminals by switching the left and right signals.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

Figure 1:
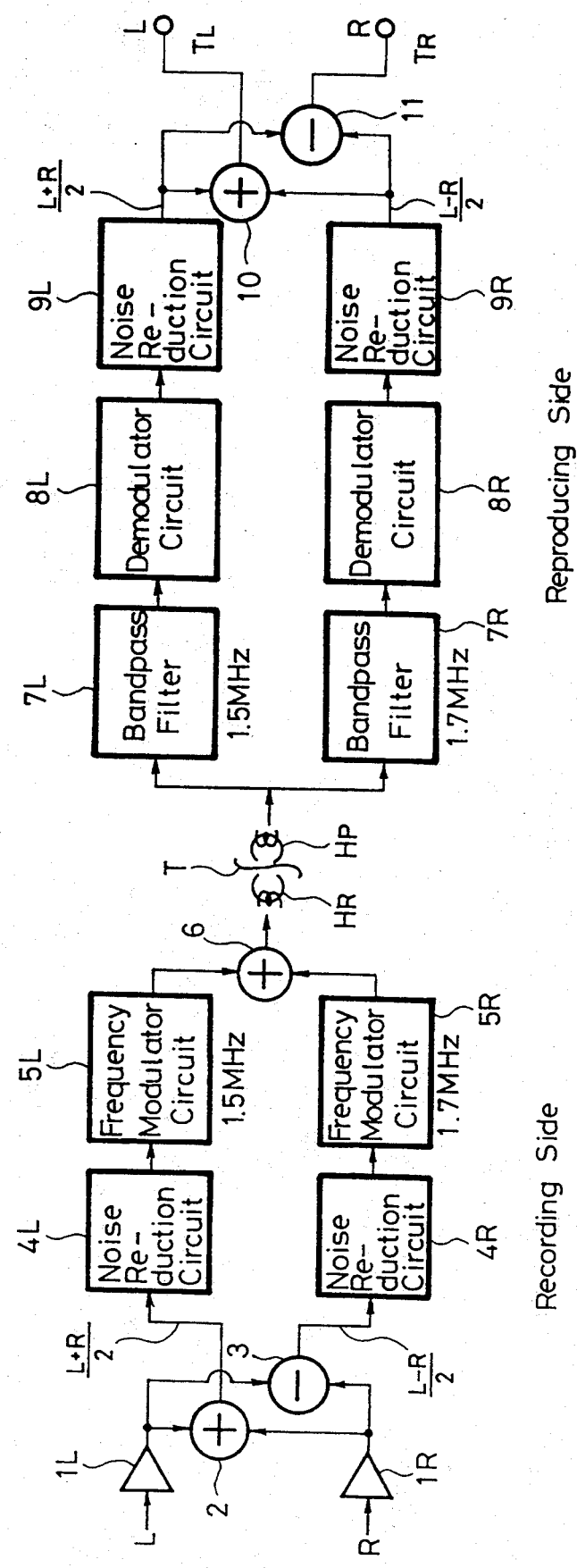
FIG. 1 is a block diagram showing a circuit configuration of a stereophonic circuit of an 8-mm video tape recorder according to the prior art.
Figure 2:
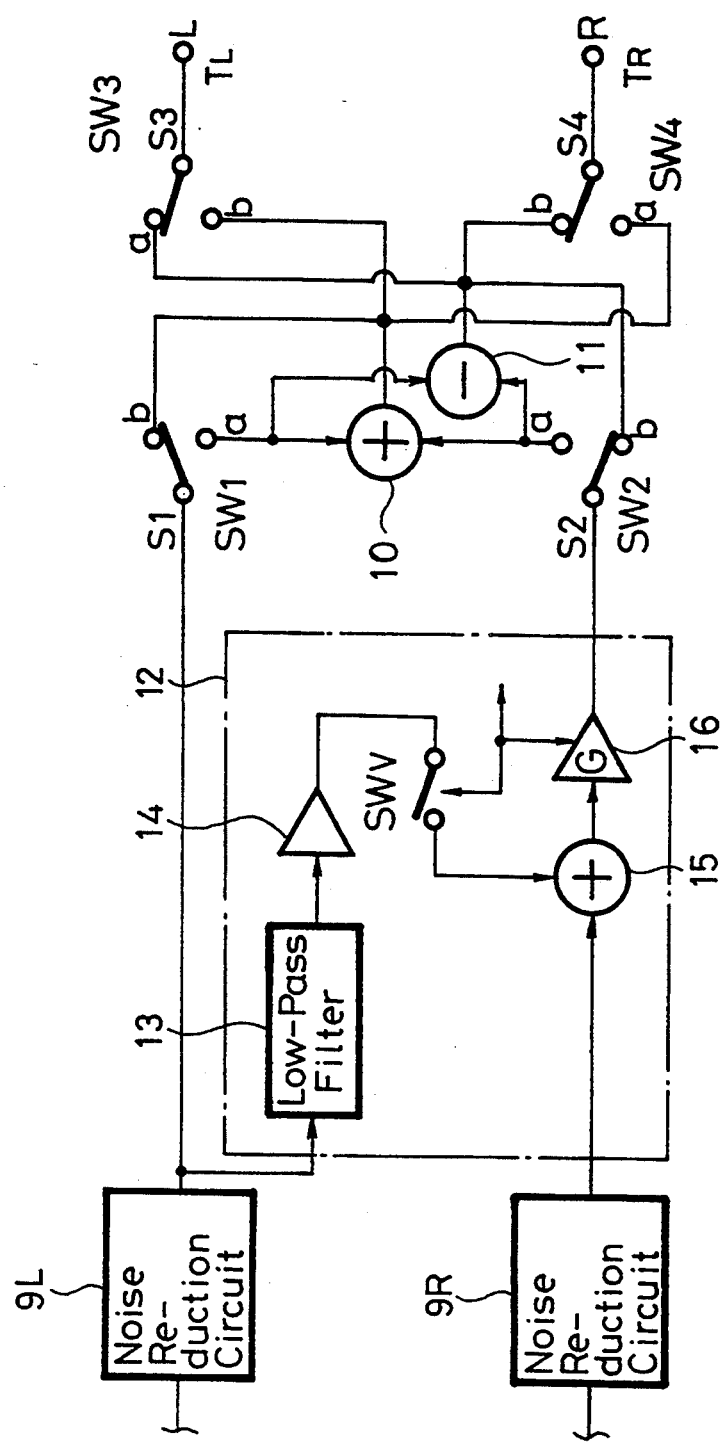
FIG. 2 is a block diagram showing a circuit configuration of an audio reproducing apparatus according to an embodiment of the present invention.

An audio reproducing apparatus according to an embodiment of the present invention, which is applied to an 8-mm video tape recorder, will hereinafter be described with reference to FIG. 2. In FIG. 2, elements and parts identical to those of FIG. 1 are marked with the same references and therefore need not be described in detail.

As shown in FIG. 2 of the accompanying drawings, there is provided a correcting apparatus which is illustrated by a one-dot chain line block 12. This correcting apparatus 12 operates to compensate a low frequency component which is sufficient in a difference signal $(L-R)/2$ when a difference signal $(L-R)/2$ having a vocal sound being erased output from the noise reduction circuit $9_R$ is reproduced. Also, this correcting apparatus 12 operates to perform a correction such as when a gain is matched with the level of the ordinary stereophonic playback mode or the like.

The correcting apparatus 12 is constructed as follows. That is, in the correcting apparatus 12, a low-pass filter 13 operates to extract only a low frequency component from a sum signal output from the noise reduction circuit $9_L$ and to compensate for the low frequency component of the difference signal by the low frequency component thus extracted because the difference signal has generally a small amount of low frequency component as compared with the sum signal. The low-pass filter 13 has a cut-off frequency of about 100 Hz. An amplifier 14 is coupled to the low-pass filter 13 to amplify the low frequency component output from the low-pass filter 13. An adder 15 operates to add the difference signal from the noise reduction circuit $9_R$ with the low frequency component supplied thereto through the amplifier 14 and a correction switch SWv which will be described later on. The correction switch SWv operates to add the low frequency component to the difference signal and also to change a gain of a variable gain amplifier 16, which will be described later on, when turned on and/or off. The variable gain amplifier 16 can vary its gain and has gains of two levels, for example, 6 decibel (dB) and 0 decibel (dB), for example. When the correction switch SWv is in its on-state, the gain of the variable gain amplifier 16 becomes 6 decibel, whereas when the correction switch SWv is in its off-state, the gain becomes 0 decibel. The gain of the variable amplifier 16 that is in a ganged relation with the correction switch SWv is controlled by a control unit (not shown) provided within the apparatus 12.

The gain of the variable amplifier 16 is varied in order to match the level of the reproduced sound from which the vocal sound is erased to the level of the ordinary stereophonic reproduced sound. More specifically, when the vocal sound is erased, the average level of the output reproduced sound (musical instrument sound such as musical accompaniment or the like) is lowered by 6 decibel (reduced to half) as compared with the average level of the ordinary stereophonic reproduced sound (vocal sound plus musical instrument sound). For this reason, the level of the reproduced sound from which the vocal sound is erased is increased by 6 decibel (twice) by the variable gain amplifier 16 and matched to the average level of the ordinary stereophonic reproduced sound. In the ordinary stereophonic reproducing mode, the gain need not be increased and hence the gain of the variable gain amplifier 16 is selected to be 0 decibel (one time), thereby the level being not changed. Thus, when the ordinary stereophonic reproducing mode and the musical instrument sound reproducing mode in which the vocal sound is erased are switched, a difference between the output levels can be removed.

Change-over switches $SW_1$ to $SW_4$ operate to switch the monaural reproducing mode, the ordinary stereophonic reproducing mode, the vocal sound erasing mode or the like in accordance with combinations thereof.

Outputs of the other contacts b of the change-over switches $SW_1$ and $SW_3$ are connected to one contact a of the change-over switch $SW_4$ and the output terminal of the adder 10, respectively. Further, other contacts b of the change-over switches $SW_2$ and $SW_4$ are connected to one contact a of the change-over switch $SW_3$ and the output terminal of the subtractor 11, respectively.

In the ordinary stereophonic playback mode, movable contacts $S_1$, $S_2$ of the change-over switches $SW_1$, $SW_2$ are respectively connected to one contacts a side thereof. The adder 10 and the subtractor 11 are interposed between the one contacts a of the change-over switches $SW_1$, $SW_2$. Outputs of the adder 10 and the subtractor 11 are respectively connected to the other contacts b of the change-over switches $SW_3$, $SW_4$ and also respectively connected through their movable contacts $S_3$, $S_4$ to the output terminals $T_L$, $T_R$, thereby the left signal L and the right signal R being output.

In the vocal sound reproducing mode, the movable contacts $S_1$, $S_2$ of the change-over switches $SW_1$, $SW_2$ are respectively connected to their other contacts b. Moreover, the movable contact $S_3$ of the change-over switch $SW_3$ is connected to one contact a and the movable contact $S_4$ of the change-over switch $SW_4$ is held at the other contact b thereof so that only the difference signal is output from the left and right output terminals $T_L$, $T_R$.

Operation of the above audio reproducing apparatus according to the present invention will be described below.

When the ordinary stereophonic sound is reproduced, the correction switch SWv of the correcting apparatus 12 is in its off-state, i.e., the correcting apparatus 12 is disabled. Accordingly, the gain of the variable gain amplifier 16 is 0 decibel (one time) so that the difference signal is not changed in level and output as it is. At that time, the movable contacts $S_1$, $S_2$ of the change-over switches $SW_1$, $SW_2$ are respectively connected to their one contacts a and the movable contacts $S_3$, $S_4$ of the change-over switches $SW_3$, $SW_4$ are respectively connected to their other contacts b. Therefore, the left and right outputs are added and subtracted by the adder 10 and the subtractor 11 respectively and then output from the output terminal $T_L$ as the left signal L and from the output terminal $T_R$ as the right signal R, thereby performing the ordinary stereophonic reproduction.

When the vocal sound is erased and only the musical instrument sound is reproduced, the correction switch SWv of the correcting apparatus 12 is turned on to make the correcting apparatus 12 become operable. On the other hand, the movable contacts $S_1$, $S_2$ of the change-over switches $SW_1$, $SW_2$ are respectively connected to the other contacts b thereof. Moreover, the movable contact $S_3$ of the change-over switch $SW_3$ is connected to its one contact a and the movable contact $S_4$ of the change-over switch $SW_4$ is held at the other contact b thereof. Accordingly, only the difference signal (L−R)/2 bypasses the adder 10 and the subtractor 11 and is output from the left and right output terminals $T_L$, $T_R$. At that time, since the correction switch SWv is in its on-state, the difference signal is added with the low frequency component through the low-pass filter 13 and the amplifier 14 and is thereby compensated. Also, the gain of the variable gain amplifier 16 becomes 6 decibel (twice). Hence, the reproduced sound of the same level as that of the sound reproduced in the ordinary stereophonic reproducing mode and from which the vocal sound is erased can be obtained and a bass sound also can be compensated, thereby preventing the reproduced sound from becoming unnatural.

As described above, the musical instrument sound from which the vocal sound was erased is compensated in playback level and in bass sound and obtained from the left and right output terminals.

As described above, according to the present invention, since the difference signal of the stereophonic signal is not formed specially like the prior art and the vocal sound is erased by effectively utilizing the difference signal of the stereophonic signal existing within the apparatus, the number of circuit parts can be reduced, the apparatus can be made compact in size with ease and can be made inexpensive. Further, since the low frequency component which is less in the difference signal can be corrected and the reproduced level when the vocal sound is erased can be corrected, the reproduced sound can be prevented from being unnatural sound even when the vocal sound is erased. Furthermore, when the reproducing mode is switched, the reproduced sound whose level is not changed can be obtained.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An audio reproducing apparatus in which a sum signal and a difference signal of left and right signals of a stereophonic signal are supplied, a left signal and a right signal are obtained from said sum signal and said difference signal and said left signal and said right signal are respectively supplied to a left signal output terminal and a right signal output terminal, comprising:
   switching means for supplying said difference signal to said left and right signal output terminals;
   said switching means is switched such that said sum signal and said difference signal are selectively supplied to an adder and a subtractor at which said left signal and said right signal are generated and output to said output terminals; and
   when said difference signal is supplied to said output terminals, a low frequency component of said sum signal is extracted and superimposed upon said difference signal.

2. The audio reproducing apparatus according to claim 1, wherein a level of said difference signal is amplified by a predetermined amount and then supplied when said difference signal is supplied to said output terminals.

3. The audio reproducing apparatus according to claim 2, wherein said predetermined amount is 6 dB.

4. The audio reproducing apparatus according to claim 2, wherein operation in which the level of said difference signal is amplified by the predetermined amount is controlled in synchronism with an on-off switch which switches the condition such that said low frequency component of said sum signal is superimposed upon said difference signal or not.

5. The audio reproducing apparatus according to claim 4, wherein said predetermined amount is 6 dB.

6. An audio reproducing apparatus comprising:
   a first input channel for receiving a sum signal representing the sum of a left signal and a right signal;
   a second input channel for receiving a difference signal representing the difference of said left signal and said right signal;
   a switching means for selectively supplying either one of said difference signal or said sum signal to a left output terminal and a right output terminal;
   a correcting circuit for extracting a low frequency component of said sum signal and adding it to said difference signal where said switch means has been selected to supply said difference signal to said left and right output terminals; and
   said correcting circuit comprises an amplifier for amplifying said difference signal by a predetermined amount before outputting it to said left and right output terminals.

* * * * *